United States Patent
Akiyama

(10) Patent No.: US 12,208,788 B2
(45) Date of Patent: Jan. 28, 2025

(54) HYBRID VEHICLE CONTROL METHOD AND HYBRID VEHICLE CONTROL DEVICE

(71) Applicant: Nissan Motor Co., Ltd., Yokohama (JP)

(72) Inventor: Hidekatsu Akiyama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 199 days.

(21) Appl. No.: 17/928,792

(22) PCT Filed: Jun. 22, 2020

(86) PCT No.: PCT/JP2020/024405
§ 371 (c)(1),
(2) Date: Nov. 30, 2022

(87) PCT Pub. No.: WO2021/245953
PCT Pub. Date: Dec. 9, 2021

(65) Prior Publication Data
US 2023/0227020 A1    Jul. 20, 2023

(30) Foreign Application Priority Data

Jun. 22, 2020 (WO) .................. PCT/JP2020/022144

(51) Int. Cl.
*B60W 20/15* (2016.01)
*B60K 6/46* (2007.10)
(Continued)

(52) U.S. Cl.
CPC ............... *B60W 20/15* (2016.01); *B60K 6/46* (2013.01); *B60W 10/06* (2013.01); *B60W 10/26* (2013.01);
(Continued)

(58) Field of Classification Search
CPC ...... B60W 20/15; B60W 10/06; B60W 10/26; B60W 2510/0638; B60W 2510/0676;
(Continued)

(56) References Cited

U.S. PATENT DOCUMENTS 6,866,610 B2 *  3/2005  Ito ....................... F02D 41/0225
                                                        477/43
2002/0165063 A1 * 11/2002 Ito ......................... F01N 3/0842
                                                        477/37

(Continued)

FOREIGN PATENT DOCUMENTS

JP     2004-143982 A     5/2004
JP     2004-278340 A    10/2004
(Continued)

Primary Examiner — Yonel Beaulieu
(74) Attorney, Agent, or Firm — Young Basile Hanlon & MacFarlane, P.C.

(57) ABSTRACT

A hybrid vehicle control method for a hybrid vehicle having a drive motor, a battery supplying electric power to the drive motor, and an engine for power generation configured to supply electric power to the battery and the drive motor includes operating the engine at a higher engine rotation speed in an operating state in which a fuel consumption device that contributes to improved fuel consumption performance does not operate than in an operating state in which the fuel consumption device operates.

7 Claims, 7 Drawing Sheets

(51) Int. Cl.
*B60W 10/06* (2006.01)
*B60W 10/26* (2006.01)

(52) U.S. Cl.
CPC ........... *B60W 2510/0638* (2013.01); *B60W 2510/0676* (2013.01); *B60W 2510/244* (2013.01); *B60W 2710/0644* (2013.01); *B60W 2710/244* (2013.01); *B60Y 2200/92* (2013.01)

(58) Field of Classification Search
CPC ... B60W 2510/244; B60W 2710/0644; B60W 2710/244; B60W 2710/0666; B60K 6/46; B60Y 2200/92; Y02T 10/62
See application file for complete search history.

(56) References Cited

U.S. PATENT DOCUMENTS

| | | | |
|---|---|---|---|
| 2008/0215205 A1* | 9/2008 | Kariya | F01N 11/002 |
| | | | 701/31.4 |
| 2010/0076663 A1 | 3/2010 | Jinno et al. | |
| 2012/0203417 A1 | 8/2012 | Matsui | |
| 2015/0210179 A1 | 7/2015 | Teraya | |
| 2017/0080809 A1* | 3/2017 | Lee | B60L 53/00 |
| 2024/0370004 A1* | 11/2024 | Gutermuth | G05B 19/41885 |

FOREIGN PATENT DOCUMENTS

| | | |
|---|---|---|
| JP | 2008-168805 A | 7/2008 |
| JP | 2010-100103 A | 5/2010 |
| JP | 2010241380 A | 10/2010 |
| JP | 2014100944 A | 6/2014 |
| WO | 2011/046123 A1 | 4/2011 |

* cited by examiner

HYBRID VEHICLE CONTROL METHOD AND HYBRID VEHICLE CONTROL DEVICE

CROSS-REFERENCE TO RELATED APPLICATION(S)

This application claims priority to International Patent Application Serial No. PCT/JP2020/022144, filed Jun. 4, 2020, the entire disclosure of which is hereby incorporated by reference.

TECHNICAL FIELD

The present invention relates to a hybrid vehicle control method and a hybrid vehicle control device.

BACKGROUND ART

JP 2010-100103A discloses control for operating an engine at an operating point at which efficiency is poor (for example, an operating point deviated from an optimal fuel consumption line) in order to promote warming up of the engine. According to the control of the above patent document, heat loss increases due to decrease in the efficiency of the engine, and the warming up of the engine is promoted by the heat.

SUMMARY OF INVENTION

However, in the control of the above patent document, the engine operates at the operating point at which the efficiency is poor until the warming up is completed, and fuel consumption performance deteriorates.

Hence, an object of the present invention is to provide a control method and a control device capable of improving fuel consumption performance during engine warming up.

According to one embodiment of the present invention, a hybrid vehicle control method for controlling a hybrid vehicle including a drive motor, a battery supplying electric power to the drive motor, and an engine for power generation configured to supply electric power to the battery and the drive motor, is provided. In this method, the engine is operated at a higher engine rotation speed in an operating state in which a fuel consumption device that contributes to improved fuel consumption performance does not operate than in an operating state in which the fuel consumption device operates.

DESCRIPTION OF EMBODIMENTS

Hereinafter, an embodiment of the present invention will be described with reference to the drawings.

[System Configuration]

Figure 1:
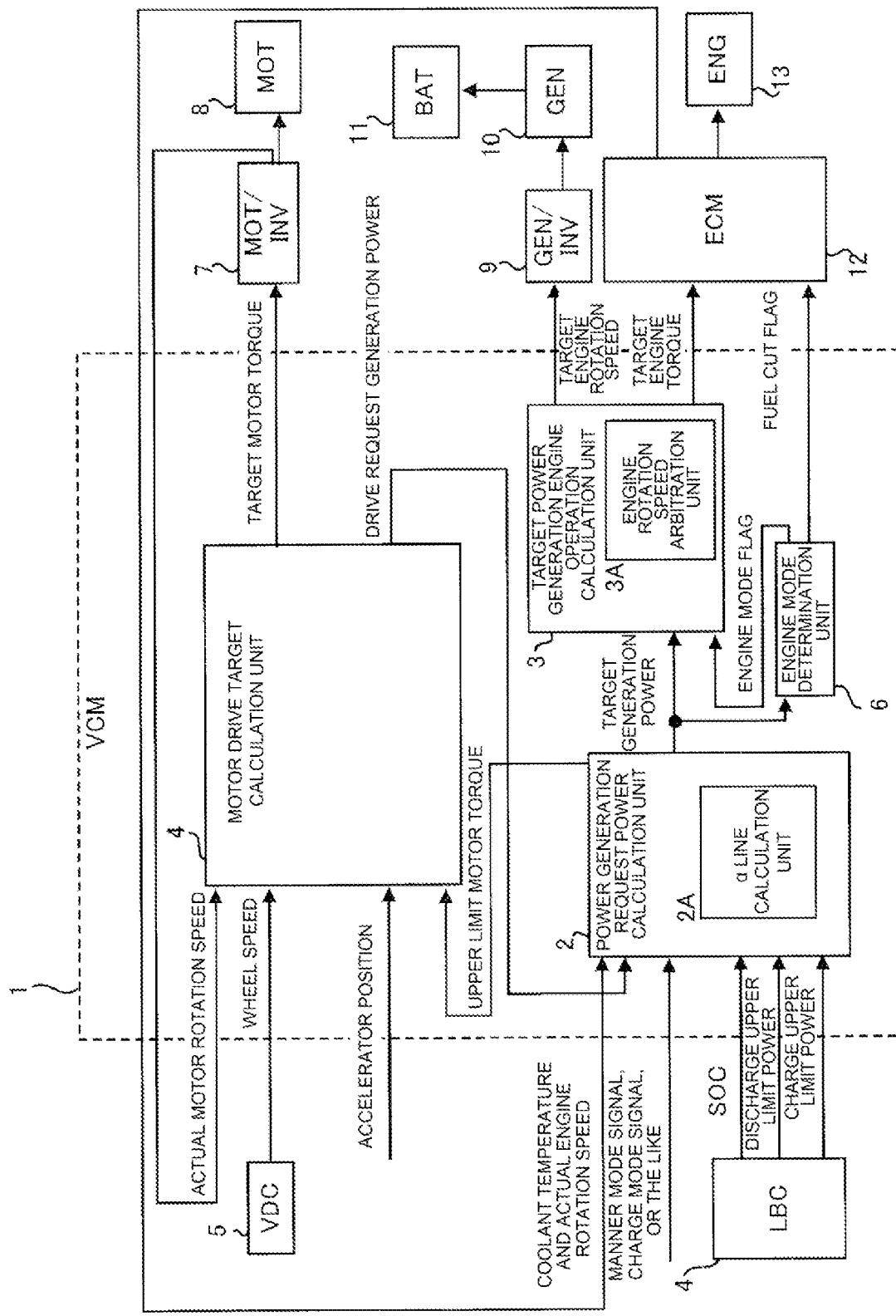
FIG. 1 is a schematic configuration diagram of a control system of a series hybrid vehicle.

FIG. 1 is a schematic configuration diagram of a control system of a series hybrid vehicle which is a premise of the present embodiment.

The series hybrid vehicle includes a drive motor 8, a battery 11 that supplies power to the drive motor 8, and an engine 13 for power generation capable of supplying power to the battery 11 and the drive motor 8. The power supplied to the battery 11 and the drive motor 8 is mainly generated by a power generation motor 10 driven by the engine 13.

A control system of this series hybrid vehicle mainly includes a vehicle control module (VCM) 1, an engine control module (ECM) 12, a vehicle dynamics controller (VDC) 5, and a battery controller (LBC) 4. These configurations are connected to one another via a so-called controller area network (CAN) so as to be able to communicate information with one another.

The VCM 1 includes a power generation request power calculation unit 2 including an α line calculation unit 2A for calculating an optimum fuel consumption line (hereinafter, also referred to as α line), a target power generation engine operation calculation unit 3 including an engine rotation speed arbitration unit 3A, and an engine mode determination unit 6 for determining an operating mode of the engine 13. It should be noted that a configuration in the VCM 1 is illustrated as a functional block diagram, and does not mean a physical configuration. In addition, the α line will be described later.

A motor drive target calculation unit 4 receives a wheel speed from the VDC 5, an accelerator position (accelerator opening degree) from an accelerator position sensor that is not illustrated, an actual rotation speed of the drive motor (also referred to as actual motor rotation speed) from a motor inverter 7, and an upper limit motor torque from the power generation request power calculation unit 2. The power generation request power calculation unit 2 calculates a target torque (also referred to as target motor torque) and a drive request generation power of the drive motor 8 by a known method based on received values. The target motor torque is input to the motor inverter 7, and the motor inverter 7 controls the drive motor 8 based on the target motor torque.

The power generation request power calculation unit 2 receives an engine coolant temperature and an actual engine rotation speed from the ECM 12, an SOC, discharge upper limit power, and charge upper limit power of the battery 11 from the LBC 4, and a manner mode signal or a charge mode signal from a mode selector that is not illustrated. The power generation request power calculation unit 2 calculates the upper limit motor torque, a target generation power, and the like based on received values. Details of the α line calculation unit 2A will be described later.

The target power generation engine operation calculation unit 3 calculates a target engine rotation speed and a target engine torque based on an engine mode flag determined by the engine mode determination unit 6 and the target generation power. The target engine rotation speed is input to a generator inverter 9, and the generator inverter 9 controls the power generation motor 10 based on the target engine rotation speed. The target engine torque is input to the ECM 12, and the ECM 12 controls the engine 13 based on a fuel cut flag determined by the engine mode determination unit 6 and the target engine torque.

[Overview of Engine Control]

As engine control of the series hybrid vehicle, the ECM 12 basically causes the engine 13 to operate for charging according to a state of charge (SOC) of the battery 11. At this time, the ECM 12 gives priority to fuel consumption performance and causes the engine 13 to operate at an operating point at which a fuel consumption rate is the lowest on the optimum fuel consumption line (also referred to as α line). The optimum fuel consumption line is an operating line connecting operating points having the highest fuel efficiency in order to obtain output for each output.

In addition, for example, when the engine 13 starts at a cooling down state, control for causing the engine 13 to operate at an operating point deviated from the α line in order to promote warming up is known. According to the control, the fuel efficiency decreases when the operating point deviated from the α line is set, in other words, heat loss increases, and thus a heat receiving amount of the engine 13 increases and the warming up is promoted.

However, according to the control described above, the operating point deviates from the α line, and thus the fuel consumption performance deteriorates.

Therefore, in the present embodiment, in order to suppress the deterioration of the fuel consumption performance, the engine 13 operates at the operating points on the α line even in an operating state before the warming up.

Figure 2:
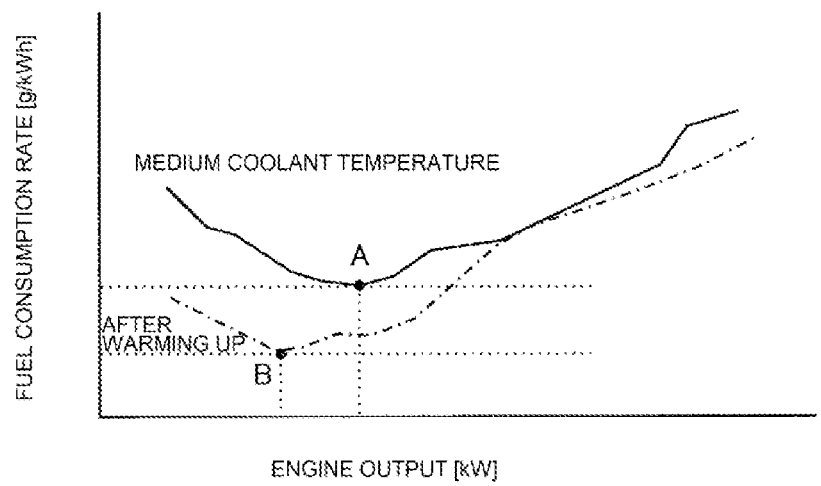
FIG. 2 is a diagram illustrating an optimum fuel consumption line.

The engine 13 includes a variable valve device (VTC), an exhaust gas recirculation device (EGR), and a knocking control device as devices (fuel consumption devices) that contribute to improved fuel consumption performance, and α lines are different between a case in which these devices operate and a case in which these devices do not operate. For example, the α lines are different between an operating state in which the fuel consumption devices such as the VTC and the EGR do not operate immediately after start of cooling down of the engine 13 and an operating state after the warming up is completed in which the fuel consumption devices operate. When a state in which the engine coolant temperature is a medium coolant temperature after the start of the cooling down and before the completion of the warming up is compared with a state after the warming up, as illustrated in FIG. 2, an operating point (point A in the diagram) at which the fuel consumption rate is the lowest at the medium coolant temperature has a higher engine output than that (point B in the diagram) after the warming up. Here, an engine output is proportional to the engine rotation speed.

In consideration of the above circumstances, in the present embodiment, the α line to be used is switched according to operation or non-operation of the fuel consumption devices in order to suppress the deterioration of the fuel consumption performance during the warming up of the engine 13. Hereinafter, details of the engine control at the medium coolant temperature according to the present embodiment will be described.

[Engine Control at Medium Coolant Temperature]

Figure 3:
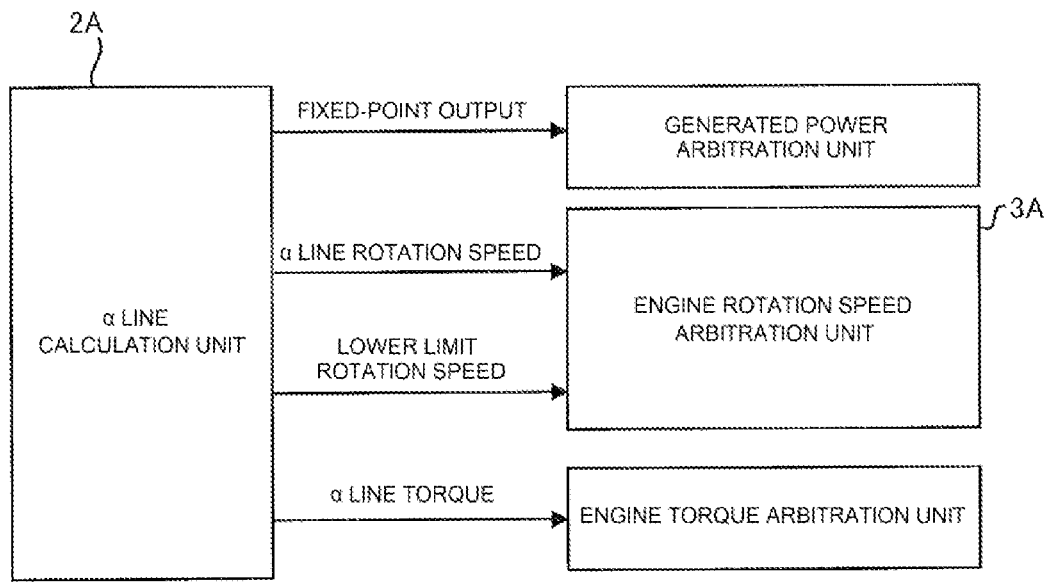
FIG. 3 is a control block diagram for controlling engine rotation speed.

FIG. 3 is a control block diagram of the α line calculation unit 2A and the engine rotation speed arbitration unit 3A for executing the engine control at the medium coolant temperature according to the present embodiment. It should be noted that FIG. 3 also illustrates a generated power arbitration unit and an engine torque arbitration unit, but these units are not configurations specific to the present invention.

The α line calculation unit 2A outputs a fixed-point output to the generated power arbitration unit, an α line rotation speed and a lower limit rotation speed to the engine rotation speed arbitration unit 3A, and an α line torque to the engine torque arbitration unit.

The fixed-point output is an engine output at the operating point of the engine 13.

The α line rotation speed is an engine rotation speed at an operating point on the α line when the engine 13 operates at the operating point. The α line rotation speed is calculated, for example, based on an engine output at the operating point A in FIG. 2 in the case of the medium coolant temperature, and is calculated based on an engine output at the operating point B in FIG. 2 in the case after the warming up.

The lower limit rotation speed is a lower limit value of the engine rotation speed calculated by calculation which will be described later.

The α line torque is an engine torque at an operating point on the α line when the engine 13 operates at the operating point. The α line torque is calculated, for example, based on the engine output at the operating point A or the operating point B on the α line, similarly to the α line rotation speed.

A feature of the present embodiment is that the lower limit rotation speed is calculated by the α line calculation unit 2A and is output to the engine rotation speed arbitration unit 3A. A process of the engine rotation speed arbitration unit 3A will be described later.

Figure 4:
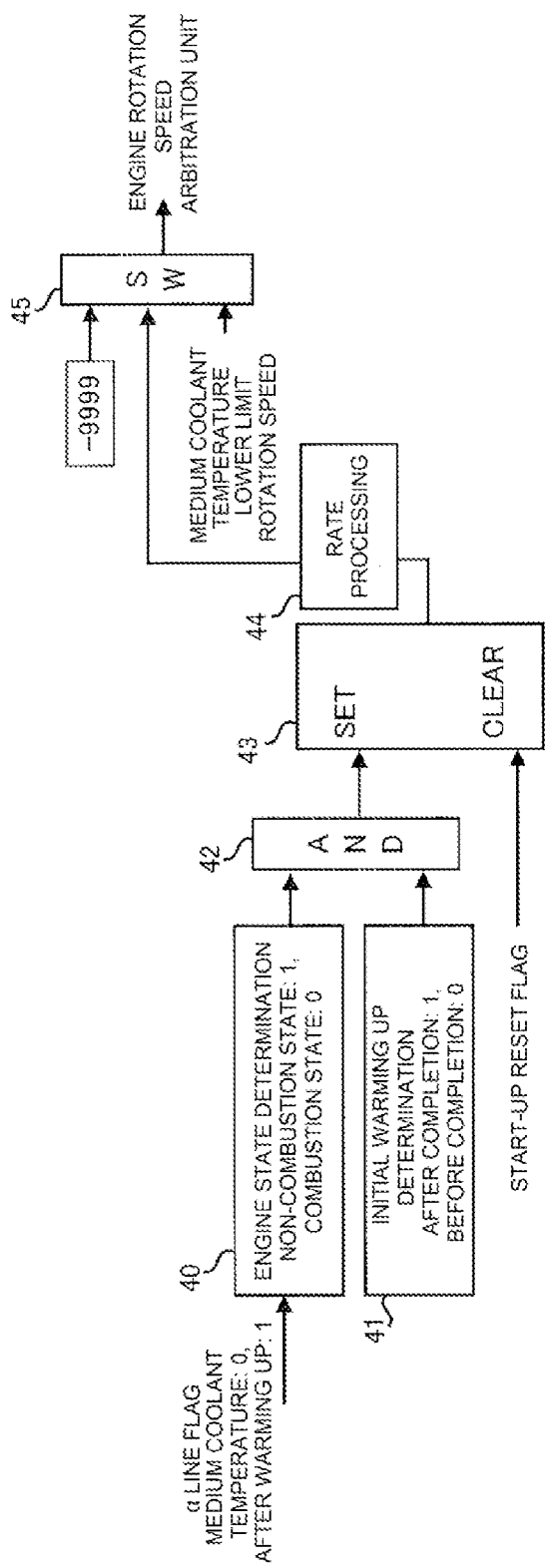
FIG. 4 is a control block diagram illustrating process contents of an α line calculation unit in FIG. 3.

FIG. 4 is a control block diagram illustrating a function of the α line calculation unit 2A for calculating the lower limit rotation speed.

The α line calculation unit 2A determines which one of the α line at the medium coolant temperature (that is, the operating state in which the fuel consumption devices do not operate) and the α line after the warming up (that is, the operating state in which the fuel consumption devices operate) is to be used based on the engine coolant temperature. An α line flag is set to 0 in the case of the medium coolant temperature, and the α line flag is set to 1 in the case after the warming up. An engine state determination unit 40 reads the α line flag and further determines whether the engine 13 is in a combustion state or in a non-combustion state. Here, the non-combustion state also includes idling operation. The engine state determination unit 40 sets a state flag to 1 when the engine 13 is in the non-combustion state, and sets the state flag to 0 when the engine 13 is in the combustion state.

An initial warming up determination unit 41 determines whether an initial warming up is completed at a current trip. It should be noted that one trip is from ignition on (that is, power on of a hybrid system) to ignition off (that is, power off of the hybrid system). The initial warming up determination unit 41 sets a warming up completion flag to 1 when the initial warming up in the current trip is completed, and sets the warming up completion flag to 0 when the initial warming up in the current trip is not completed.

A flag determination unit 42 determines whether a condition that the state flag is 0 and the warming up completion flag is 0 is satisfied. When the condition is satisfied, setting of the lower limit rotation speed is determined (set) by a lower limit setting unit 43. In addition, the lower limit setting unit 43 clears each of the flags when a start-up reset flag indicating a trip start time is input.

When the lower limit rotation speed is set, a rate processing unit 44 sets a change speed of the engine rotation speed when limitation of the lower limit rotation speed-based engine rotation speed is released after the completion of the warming up, and then outputs the fact that the change speed is set and the change speed to a switch 45.

The switch 45 selects a medium coolant temperature lower limit rotation speed when the lower limit rotation speed is set, selects −9999 as a rotation speed when the lower limit rotation speed is not set, and outputs a selected value to the engine rotation speed arbitration unit 3A. It should be noted that the rotation speed of −9999 does not limit the lower limit rotation speed. The medium coolant temperature lower limit rotation speed is, for example, around 2000 [rpm].

Figure 5:
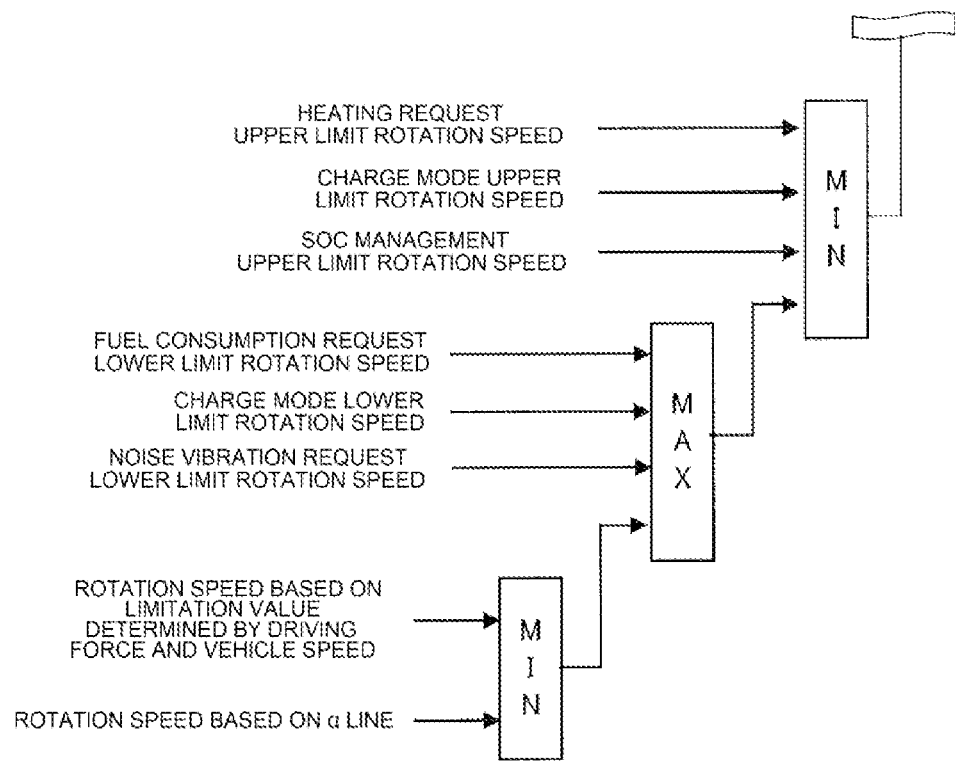
FIG. 5 is a block diagram illustrating process contents of an engine rotation speed arbitration unit in FIG. 3.

FIG. 5 is a control block diagram illustrating a function of the engine rotation speed arbitration unit 3A for setting the engine rotation speed.

The engine rotation speed arbitration unit 3A determines the engine rotation speed in three stages.

In a first stage, an engine rotation speed based on the $\alpha$ line and an engine rotation speed limited by a limitation value determined by a driving force and a vehicle speed are compared, and a lower one is selected. The limitation value is an upper limit value of the engine rotation speed for making an operation sound of the engine less noticeable when the driving force is small or the vehicle speed is low. In the present embodiment, the limitation value that changes according to the driving force and the vehicle speed is mapped in advance, and the limitation value is determined based on this map.

In a second stage, the selected engine rotation speed, a fuel consumption request lower limit rotation speed, a charge mode lower limit rotation speed, a noise vibration request lower limit rotation speed are compared, and the highest engine rotation speed is selected. The fuel consumption request lower limit rotation speed is a lower limit engine rotation speed determined based on the $\alpha$ line at the medium coolant temperature.

The charge mode lower limit rotation speed is a lower limit engine rotation speed when a charge mode, which will be described later, is executed. The charge mode is an operating mode for increasing the SOC of the battery 11, which is executed according to a switch operation of a driver. When the charge mode is not executed, if the SOC of the battery 11 decreases to a discharge lower limit value, the engine 13 is controlled to increase a power generation amount, but in the charge mode, if the SOC of the battery 11 is equal to or less than a charge upper limit value, the engine rotation speed increases in order to increase the power generation amount regardless of the SOC.

The noise vibration request lower limit rotation speed is a lower limit engine rotation speed that satisfies a request (so-called noise vibration request) for suppressing noise and vibration.

In a third stage, a heating request upper limit rotation speed, a charge mode upper limit rotation speed, an SOC management upper limit rotation speed, and the engine rotation speed selected at the second stage are compared, and the lowest engine rotation speed is selected.

The heating request upper limit rotation speed is an upper limit engine rotation speed at the time of executing heating control, which is control for increasing the engine coolant temperature so as to satisfy the heating request. At the time of executing the heating control, when the engine 13 operates at the operating point on the $\alpha$ line, a heat generation amount of the engine 13 is low, and thus the engine coolant temperature is less likely to increase. In other words, an operating time of the engine 13 for increasing the engine coolant temperature increases. As the operating time of the engine 13 increases, the SOC of the battery 11 may excessively increase. Here, when the heating control is executed, in order to prevent the excessive increase in the SOC of the battery 11, a heating request upper limit rotation speed lower than the operating point on the $\alpha$ line is set. However, the fuel consumption performance may deteriorate simply by decreasing the engine rotation speed, and thus an engine rotation speed that can suppress the excessive increase in the SOC of the battery 11 and suppress the deterioration of the fuel consumption performance is set as the heating request upper limit rotation speed. Specially, the setting is according to a specification of the engine 13, a capacity of the battery 11, and the like.

The SOC management upper limit rotation speed is an upper limit engine rotation speed at the time of executing SOC management control, which is control for keeping the SOC of the battery 11 within a range from a dischargeable lower limit value to a chargeable upper limit value. The SOC management control is control generally executed in the hybrid vehicle, and thus the description is omitted.

The heating request upper limit rotation speed, the charge mode upper limit rotation speed, and the SOC management upper limit rotation speed are all engine rotation speeds for preventing the SOC of the battery 11 from excessively increasing. That is, in the present embodiment, even in a case where the fuel consumption request lower limit rotation speed is selected in the second stage, as long as the engine rotation speed for preventing the SOC of the battery 11 from excessively increasing in the third stage is low, a finally selected engine rotation speed is the engine rotation speed for preventing the SOC of the battery 11 from excessively increasing. It should be noted that the heating request upper limit rotation speed changes when the warming up of the engine 13 is completed.

Figure 6:
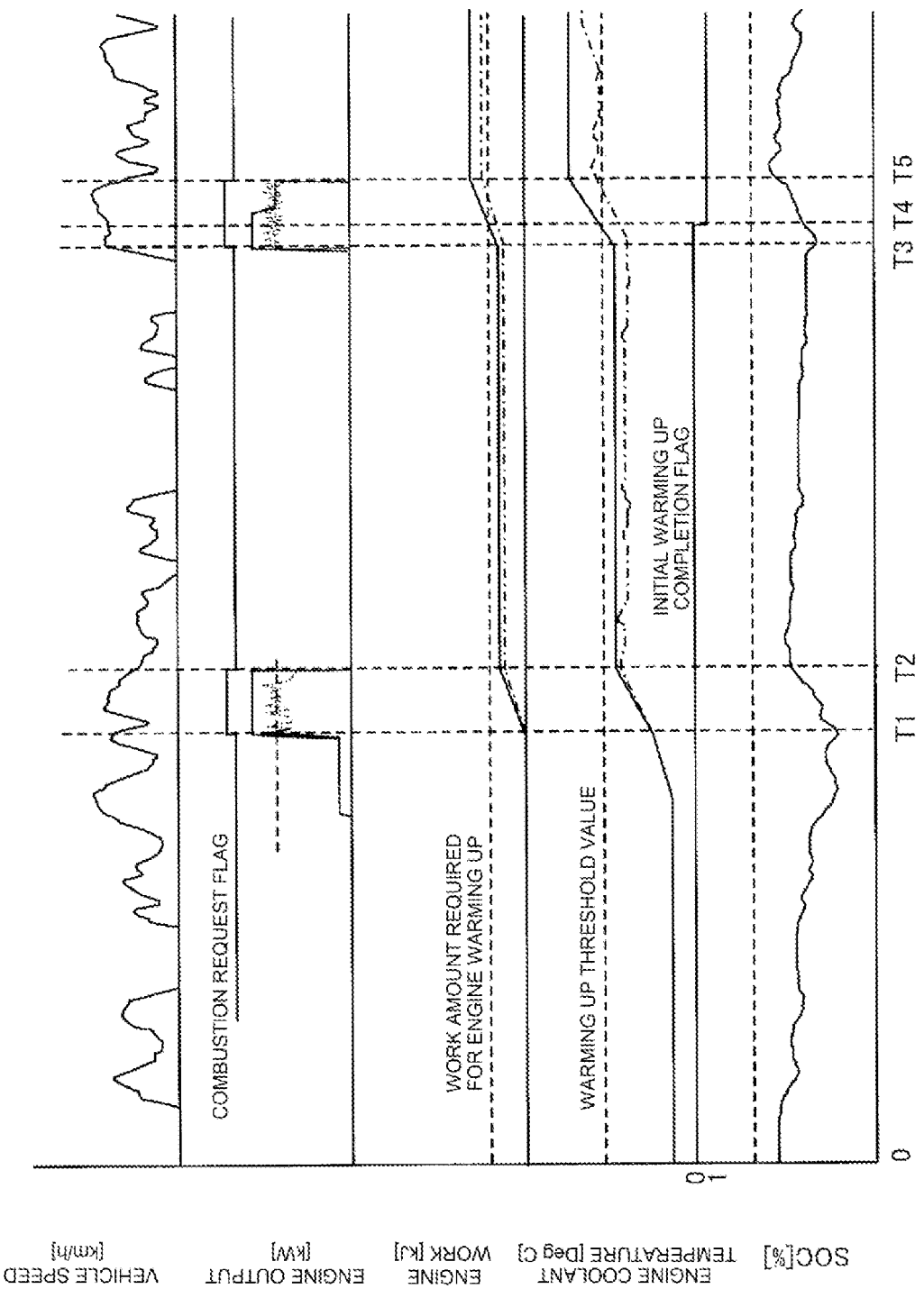
FIG. 6 is a timing chart when control of the present embodiment is executed.

FIG. 6 is a timing chart when the control of the present embodiment is executed. In a chart of the engine output and a chart of an engine work in the diagram, a solid line indicates a case where the control of the present embodiment is executed, and a dashed line indicates a comparative example, specifically, a case where the warming up is executed at the operating point where the fuel efficiency is poor. It should be noted that the engine output is proportional to the engine rotation speed as described above, and thus the chart of the engine output can be replaced with that of the engine rotation speed.

At a timing T1, a warming up request for the engine 13 is generated, and the engine output increases accordingly. At this time, in the present embodiment, the engine 13 operates at an engine rotation speed based on the $\alpha$ line for the medium coolant temperature or an engine rotation speed higher than the engine rotation speed, and thus the engine output (engine rotation speed) is higher than that of the comparative example. The warming up request continues until a timing T2 at which the engine coolant temperature becomes a temperature slightly lower than a warming up threshold value. It should be noted that the reason why the warming up request is completed even though the warming up threshold value is not reached at the timing T2 is that another control is executed in parallel with the control of the present embodiment. Therefore, without such a request, the warming up request continues until the engine coolant temperature reaches the warming up threshold value. In addition, the engine operates before the timing T1, and the operation is an operation corresponding to a catalyst warming up request flag set by a routine different from the control of the present embodiment.

The engine 13 stops at the timing T2, and then operates again at a timing T3. This operation is an operation based on a request based on SOC control of the battery 11, for example, an operation based on the selection of the charge mode. The warming up is not completed here, and thus the engine 13 operates at the same engine rotation speed as that at the timings T1 to T2.

Then, the engine coolant temperature reaches the warming up threshold value at a timing T4. However, the engine output does not immediately decrease. The reason is that a minimum holding time of the lower limit rotation speed is set in the present embodiment. The reason why the minimum holding time is set is that, for example, as in a case in which the warming up is completed immediately after the engine is started, if the engine rotation speed increases or decreases in a short time, the driver may feel troublesome. A specific minimum holding time is set by adaptation or the like, and is set to, for example, about 3 seconds to 5 seconds.

After the minimum holding time is elapsed, the engine rotation speed decreases at the change speed set by the rate processing unit 44 described above.

In addition, as the warming up of the engine 13 is completed at the timing T4, an initial warming up completion flag becomes 1. Accordingly, even if the engine coolant temperature falls below the warming up threshold value again during the trip, the control of the present embodiment is not executed. The reason is that the driver or the like may feel uncomfortable when the engine rotation speeds are different every time the engine is started after the warming up is completed once.

Here, a method of decreasing the engine rotation speed after the completion of the warming up of the engine will be described with reference to FIGS. 7 and 8.

Figure 7:
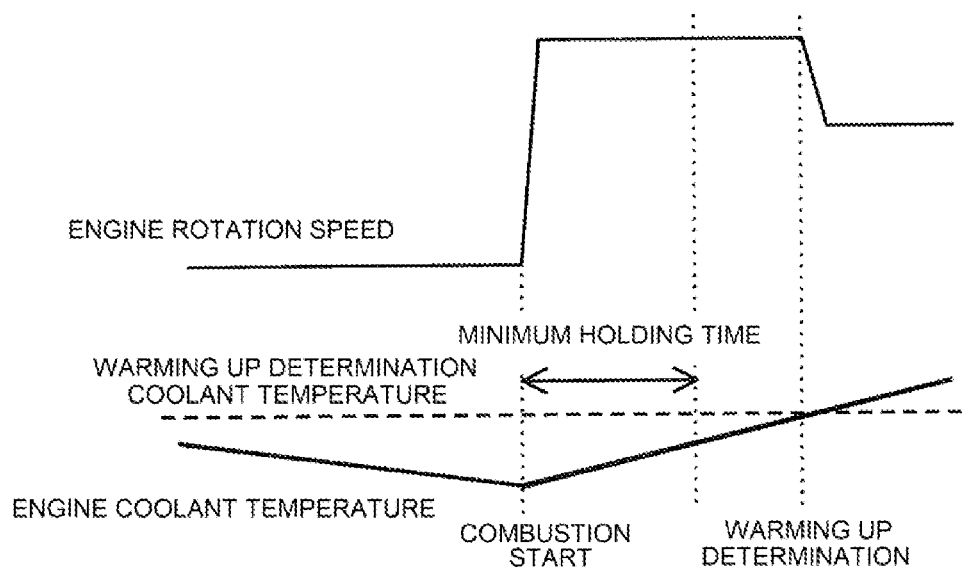
FIG. 7 is a timing chart when warming up is completed after elapse of a minimum holding time.
Figure 8:
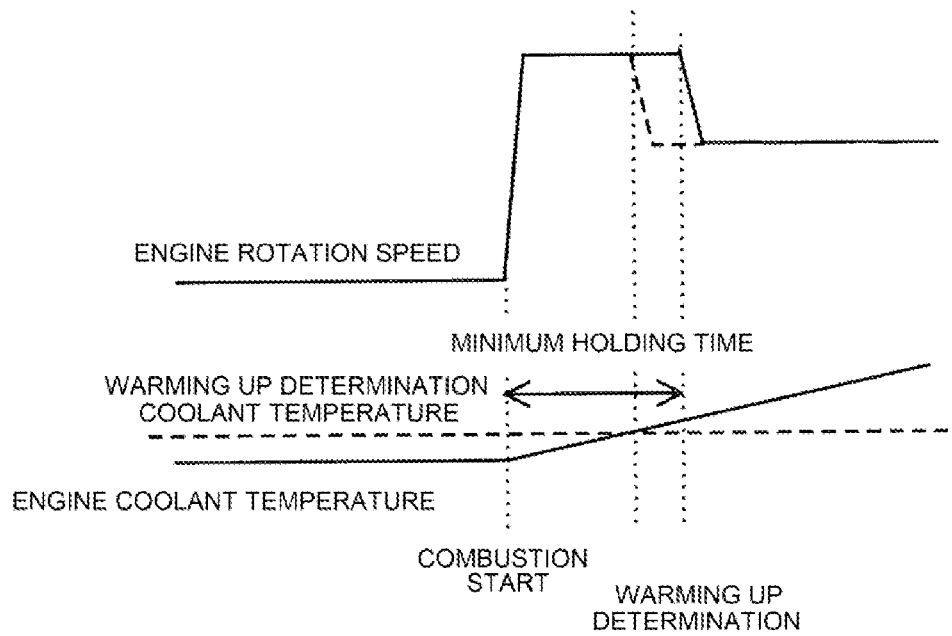
FIG. 8 is a timing chart when the warming up is completed before the elapse of the minimum holding time.

FIG. 7 illustrates a case in which the warming up is completed after elapse of the minimum holding time. FIG. 8 illustrates a case in which the warming up is completed before the elapse of the minimum holding time.

As illustrated in FIG. 7, when the warming up is completed after the elapse of the minimum holding time, the limitation of the engine rotation speed based on the lower limit rotation speed is released at a timing at which the warming up is completed, and the engine rotation speed decreases. On the other hand, as illustrated in FIG. 8, when the warming up is completed before the elapse of the minimum holding time, the limitation of the engine rotation speed based on the lower limit rotation speed is released at a timing at which the minimum holding time is elapsed, and the engine rotation speed decreases. It should be noted that count of the minimum holding time is started every time warming up operation is started. For example, the count is started when the engine 13 starts at the timing T3 of FIG. 8.

The change speed in decreasing the engine rotation speed may be set freely. For example, a change speed that does not cause the driver or the like to feel uncomfortable due to a steep decrease is set by adaptation or the like.

[Effects]

According to the present embodiment as described above, there is provided a method for controlling a hybrid vehicle including the drive motor 8, the battery 11 configured to supply power to the drive motor 8, and the engine 13 for power generation configured to supply power to the battery 11 and the drive motor 8. In this control method, the engine 13 operates at a higher engine rotation speed in an operating state in which a fuel consumption device that contributes to improved fuel consumption performance does not operate than in an operating state in which the fuel consumption device operates. In other words, a lower limit rotation speed of the engine 13 is set to be higher in the operating state in which the fuel consumption device does not operate than that in the operating state in which the fuel consumption device operates. The reason is that, in the operating state in which the fuel consumption device does not operate, for example, in order to avoid knocking, an ignition timing of the engine 13 is retarded as compared with the operating state in which the fuel consumption device operates, a possibility of occurrence of knocking decreases as the engine rotation speed increases, and thus a retard amount can be reduced. According to the present embodiment, it is possible to improve fuel consumption performance in the operating state in which the fuel consumption device does not operate, in other words, in an operating state in which an engine coolant temperature is lower than a warming up threshold value.

In the present embodiment, whether the operating state is the operating state in which the fuel consumption device operates is determined based on the engine coolant temperature. Accordingly, it is possible to determine whether the operating state is the operating state, in which the fuel consumption device operates, using a general coolant temperature sensor provided in the engine 13.

In the present embodiment, when initial warming up is completed after start of a trip, an engine rotation speed in the operating state in which the fuel consumption device operates is maintained even if the engine coolant temperature decreases during the trip. Accordingly, it is possible to prevent a driver or the like from feeling uncomfortable due to a difference in the engine rotation speed every time the engine 13 is started.

In the present embodiment, when the engine rotation speed in the operating state in which the fuel consumption device does not operate is set, the set engine rotation speed is held for a preset minimum holding time. Accordingly, it is possible to prevent the driver or the like from feeling troublesome due to an upper limit of the engine rotation speed in a short time.

In the present embodiment, an upper limit engine rotation speed for suppressing excessive increase in a state of charge (SOC) of the battery 11 is compared with the lower limit rotation speed in the operating state in which the fuel consumption device does not operate, and the engine operates at a lower engine rotation speed. Accordingly, it is possible to suppress the excessive increase in the SOC of the battery 11.

In the present embodiment, the upper limit engine rotation speed is an engine rotation speed for suppressing the excessive increase in the SOC of the battery 11 when the engine 13 is operated to increase an engine coolant temperature in response to a heating request. Accordingly, it is possible to suppress the excessive increase in the SOC of the battery 11 and satisfy the heating request even in an operating state in which the engine coolant temperature is low.

Although the embodiment of the present invention has been described above, the above-mentioned embodiment is merely a part of application examples of the present invention, and is not intend to limit the technical scope of the present invention to the specific configurations of the above-mentioned embodiment.

The invention claimed is:

1. A hybrid vehicle control method for a hybrid vehicle, the hybrid vehicle comprising:
   a drive motor;
   a battery supplying electric power to the drive motor;
   a fuel consumption device that contributes to improvement of fuel consumption performance; and
   an engine for power generation configured to supply electric power to the battery and the drive motor, the engine having a first operating state, in which the fuel consumption device is operated, and a second operating state, in which the fuel consumption device is not operated, wherein, in the first operating state, the engine is operated at a first operating point on an optimal fuel consumption line, and, in the second operating state, the engine is operated at a second operating point on the optimal fuel consumption line, wherein the engine is operated at a higher engine rotation speed in the second operating state than in the first operating state;

and the hybrid vehicle control method comprising:
determining whether the engine is in the first operating state or the second operating state based on an engine coolant temperature.

2. The hybrid vehicle control method according to claim 1, wherein, when initial warming up is completed after start of a trip, an engine rotation speed in the first operating state is maintained during the trip even if the engine coolant temperature decreases.

3. The hybrid vehicle control method according to claim 1, wherein, when an engine rotation speed in the second operating state is set, the engine rotation speed is held for a preset minimum holding time.

4. The hybrid vehicle control method according to claim 1, further comprising:
comparing an upper limit engine rotation speed for suppressing excessive increase in a state of charge of the battery and an engine rotation speed in the second operating state; and
operating the engine at a lower engine rotation speed.

5. The hybrid vehicle control method according to claim 4, wherein the upper limit engine rotation speed is an engine rotation speed for suppressing the excessive increase in the state of charge of the battery when the engine is operated to increase the engine coolant temperature in response to a heating request.

6. A hybrid vehicle control device for a hybrid vehicle, the hybrid vehicle comprising:
a drive motor;
a battery configured to supply power to the drive motor;
a fuel consumption device that contributes to improvement of fuel consumption performance;
an engine for power generation configured to supply power to the battery and the drive motor, the engine having a first operating state, in which the fuel consumption device is operated, and a second operating state, in which the fuel consumption device is not operated, wherein, in the first operating state, the engine is operated at a first operating point on an optimal fuel consumption line, and, in the second operating state, the engine is operated at a second operating point on the optimal fuel consumption line, wherein the engine is operated at a higher engine rotation speed in the second operating state than in the first operating state; and
a control unit configured to control the drive motor, a state of charge of the battery, and the engine, the control unit further configured to:
determine whether the engine is in the first operating state or the second operating state based on an engine coolant temperature.

7. The hybrid vehicle control method according to claim 1, wherein the hybrid vehicle is configured as a series hybrid vehicle.

* * * * *